Patented May 9, 1933

1,908,454

UNITED STATES PATENT OFFICE

EARL J. SNIDER, OF DENAIR, CALIFORNIA

FOOD PRODUCT AND METHOD OF MAKING THE SAME

No Drawing.    Application filed March 2, 1931. Serial No. 519,689.

My invention, generally, relates to foodstuffs which are adaptable as a spread for or upon other foods, such as bread, crackers, waffles and the like. More particularly, my invention relates to a food product of substantially butter-like consistency and containing honey.

Honey, as is well known, is a sweet glutinous or viscous fluid which is secreted by the working bee from the nectar of flowers and deposited by the insect in wax cells forming what is known as the honey comb. The fluid can be extracted from the honey comb in various ways, such as by mechanical means or, by simply permitting the honey to flow from the comb at ordinary temperatures. If the flow ceases, the residual comb can be heated and pressed to obtain additional honey therefrom.

The essential characteristics of honey are varying quantities of sugar; dextrose, laevulose, and sometimes cane sugar, together with a small quantity of water, coloring matter and some acids, and, because of the sugar content, honey is highly valued as an article of diet and is largely consumed.

Honey remains clear and substantially entirely liquid in form for a long period of time if kept in the dark and at normal temperatures, but upon exposure to the light and cold it crystallizes or becomes more or less granular in consistency. In such condition, it is unsatisfactory as a food and therefore is heated to restore it to liquid form or in what may be termed its natural state of consistency, that is, substantially non-granular in form. When applied to or used in connection with other food-stuffs, such as bread, waffles, pan-cakes and the like, honey has a tendency to "run" or to flow from such foods and to adhere, in a sticky mass, to the plate holding the food-stuffs and, in this respect, honey in its natural state of consistency, is unsatisfactory to the consumers.

It is an object of my invention to provide a food product containing honey, which is adaptable as a smooth spread for other food-stuffs.

It is a further object of my invention to provide a food spread containing honey and, which, when exposed to the light and cold, will not crystallize to an appreciable extent.

It is a still further object of my invention to provide a honey contained food product of smooth butter-like consistency which retains such consistency under normal temperatures.

A still further object of my invention is to provide a novel, facile and relatively inexpensive method of producing a food product of the aforementioned character.

Other objects of the invention, together with some of its advantageous features, will be set forth in the following description of the preferred embodiment of the invention and of the preferred method of producing such embodiment. It is to be understood that the appended claims are to be accorded a range of equivalents consistent with the state of the prior art.

In carrying out the method of making my novel food spread, any desired quantity of honey can be used, the quantity employed being primarily dependent upon the amount of the finished product which is desired. As is well known, honey, in general, is available in any one of several different forms or states of consistency. The available honey, for example, may be entirely in liquid form; in a partially liquid and partially hardened or solidified state; in substantially entirely solidified form, that is, not syrupy; and in a partially or substantially entirely crystallized state, depending, in the first three instances, upon the season of the year in which the honey is extracted from the honey comb, and in the last instance, upon the length of time that the honey has been exposed to the light and to cold.

While honey entirely in a liquid state or honey which is partially or even substantially entirely crystallized may be employed in carrying out the process of my invention, I have found that, with respect to honey in the first above mentioned state, a comparatively long period of time is required to complete the process and that the resultant product is not satisfactory, and that, with respect to honey in the other of the above mentioned states, the resultant product not only is unstable, in that it is subject to a return to liquid form at elevated temperatures, during which return the honey appears curdled or fermented, but also the resultant product, even while stable, has a granular appearance and it not, in fact, a spread of smooth consistency. Best results, I have found, are obtained by employing honey which is at a critical crystallization state, that is, honey which is on the threshold of crystallization or, in other words, honey which is about to crystallize.

In accordance with my invention, I first reduce the available honey to a state in which the honey is at the threshold of crystallization. If liquid honey is available, I expose the honey to light for a predetermined period or to low temperature for a given period until the honey is about to crystallize. Should the available honey be partially or substantially entirely crystallized, I subject the honey to an elevated temperature, say from 120° F. to 130° F. until the available honey is in the condition as above defined. The honey at the threshold of crystallization is then placed in an uncovered container so that the honey will be exposed to the air. I then subject such grade of honey to a violent agitation, preferably by employing a mechanical agitator, for a predetermined period of time until the honey is thoroughly impregnated with air. I find it to be advantageous to maintain the temperature of the honey, during such agitation, between 100° F. and 110° F. and to agitate the honey for a period of from three-quarters of an hour to an hour and a half. By this process, the initial volume of the honey can be increased an appreciable extent, usually the increase being about twelve per cent over the initial volume. While a mechanical agitator is preferred, the honey may be whipped by a manually actuated agitator or beater but, it is to be noted, the period of agitation to obtain the best resultant product and an increase in initial volume to the extent above mentioned, with a manually actuated agitator, will be considerably greater than with the use of a mechanical agitator.

The product which is obtained from the aeration of honey in a critical crystallization stage, that is honey about to crystallize, may be termed "emulsified" honey and by "emulsified" honey is meant a product which consists of a heterogeneous mixture of common air and honey of the character hereinabove specifically defined having a cream-like consistency. It will be noted that the color of the creamed or "emulsified" honey is greyish-white, whereas the color of the honey, prior to processing or aeration, is normally light or dark amber, depending upon the source thereof.

As a further step in the process of my invention, I permit the aerated honey, that is the honey of cream-like consistency, to remain quiescent or to set for a period of from twenty to thirty hours and until it becomes semi-solid or of butter-like consistency. During the hardening process and after hardening, it will be observed that no change has occurred in the color but that the aerated honey remains greyish-white. If desired, of course, the creamed or "emulsified" honey can be allowed to set or to harden in the original container in which the agitation thereof was carried on, or it can be poured into another or other containers for hardening. After solidifying to a substantially butter-like consistency, the product can readily be packed into cartons for distribution and sale.

I have found that honey, processed in the manner above described, will retain its smooth butter-like consistency under normal temperatures and also that the aerated honey will crystallize only at a slow rate, the crystallization being barely perceptible. In this latter respect, it is much more satisfactory to the consumer than liquid honey. Further, the honey spread of my invention does not lose the delectable taste of non-aerated honey.

The product of my invention has met with great favor, it being highly desirable as a sandwich spread and as a spread for waffles, pan-cakes and the like, inasmuch as it does not "run" or flow from such food-stuffs nor does it adhere in a sticky mass to instruments employed for spreading the creamed honey.

I claim:

1. The method of preparing a food product containing honey which consists in the steps of placing honey in a condition about to crystallize of mixing such conditioned honey with air; and of then permitting the aerated conditioned honey to set.

2. The method of preparing a food product which consists in the steps of placing honey in a condition about to crystallize; of mechanically agitating a mixture of said conditioned honey and air at a predetermined temperature; and of then permitting the aerated conditioned honey to set for a predetermined period of time without further agitation.

3. The method of preparing a food product containing honey which consists in the steps of placing honey in a condition about to crystallize; of mixing the conditioned honey with air at a temperature between 100° F and 110° F.; and of then permitting the aerated conditioned honey to set for a predetermined period.

4. The method of preparing a food product which consists of maintaining honey at the threshold of its crystallization; of mixing such honey with air for a predetermined period; and of then permitting such aerated honey to set.

5. An edible product adaptable as a spread for other food-stuffs consisting of hardened aerated conditioned honey, said conditioned honey comprising honey at the threshold of crystallization.

6. The process of preparing a food product containing honey which comprises cooling honey in a liquid state to a temperature and for a period of time as to place the honey in a state about to crystallize, and mechanically agitating the processed honey in the presence of air and at a temperature above the temperature at which the honey will crystallize.

7. The process of preparing a food product containing honey which comprises heating crytallized honey at a temperature sufficiently high to decrystallize the honey, maintaining the processed honey at the threshold of crystallization, and then aerating the honey when at the threshold of crystallization.

In testimony whereof, I have hereunto set my hand.

EARL J. SNIDER.